Dec. 28, 1948.                    H. L. TRAUTMANN                    2,457,417
                                    CUTTING TOOL
Filed Dec. 14, 1945                                               2 Sheets-Sheet 1
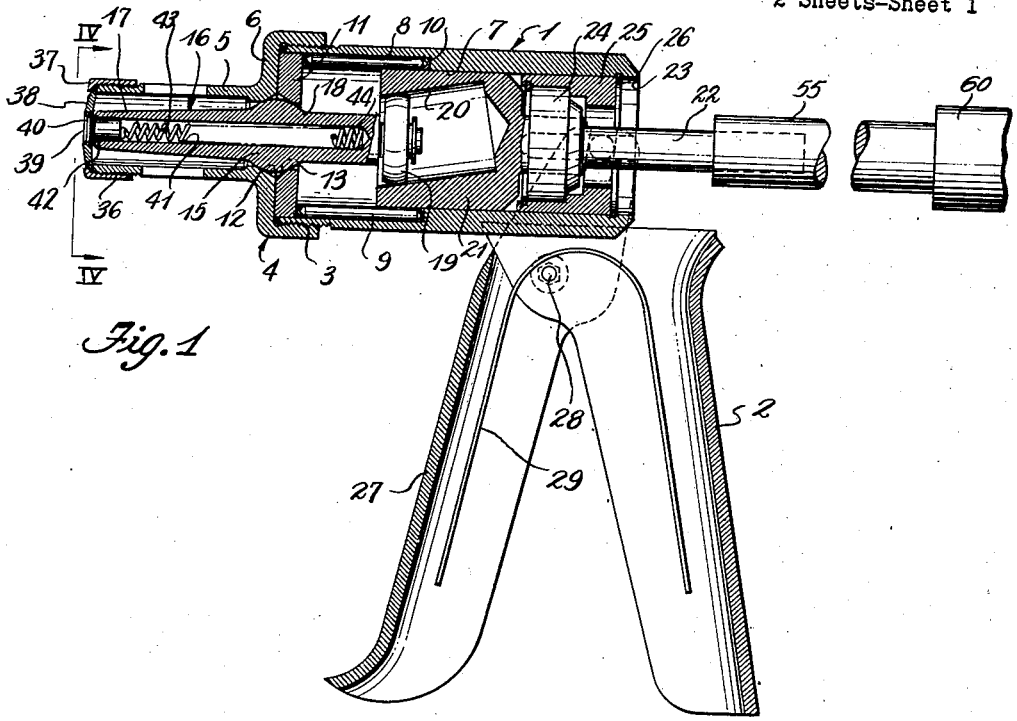
Fig. 1
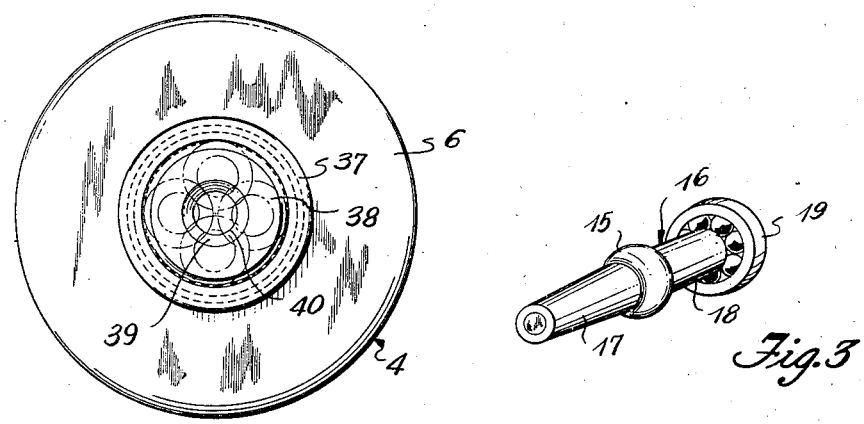
Fig. 4                                   Fig. 3
INVENTOR.
HERBERT L. TRAUTMANN
BY
Harold W. Mattingly
Attorney Dec. 28, 1948.  H. L. TRAUTMANN  2,457,417
CUTTING TOOL
Filed Dec. 14, 1945  2 Sheets-Sheet 2
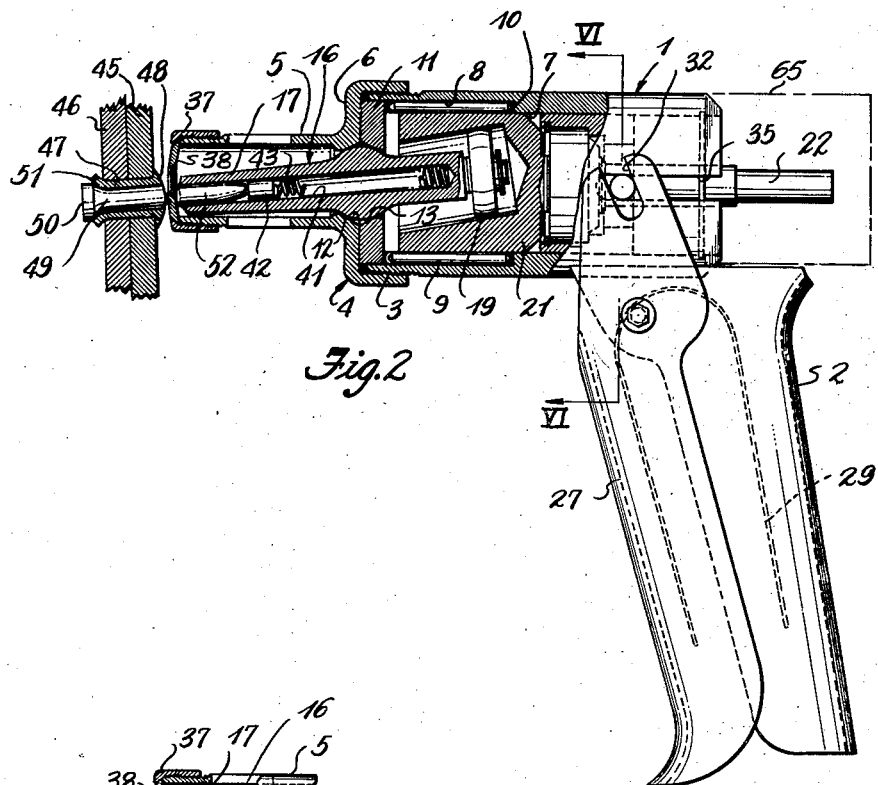
INVENTOR.
HERBERT L. TRAUTMANN
BY
Harold W. Mattingly
Attorney Patented Dec. 28, 1948

2,457,417

UNITED STATES PATENT OFFICE 2,457,417

CUTTING TOOL

Herbert L. Trautmann, Los Angeles, Calif., assignor to Cherry Rivet Company, Los Angeles, Calif., a corporation of California Application December 14, 1945, Serial No. 635,065

14 Claims. (Cl. 30—272)

This invention relates to cutting tools and has particular reference to a rivet stem trimmer which finds particular utility when employed to cut off the protruding rivet stem remaining after the setting of certain types of blind rivets.

In certain types of construction, and particularly in the construction of aircraft, there is occasion to use a type of rivet which is popularly known as a "blind rivet," the name being derived from the fact that the rivet may be installed in those locations where access may be had to only one side of the work, thus preventing the use of conventional rivets with riveting hammers and bucking-bars. One widely used type of blind rivet comprises a headed tubular rivet which is insertable into the rivet receiving holes and which includes a stem member. The stem member is drawn outwardly during the setting operation and in so doing forms a rivet head on the opposite side of the work pieces. The setting apparatus used ordinarily operates to break the rivet stem in tension when the setting operation is complete. This leaves a protruding stem which must later be cut off flush with the head of the rivet, and, in the case of aircraft constructions, must be carefully smoothed and contoured to reduce to a minimum the projection of the rivet assembly beyond the skin of the aircraft.

Prior to my invention this cutting and trimming operation was performed in a laborious and time-consuming manner through the use of hand cutters, hack-saws, files and like hand tools. As a result considerable time was lost in completing installations employing blind rivets, and an undesirable lack of uniformity in the finished product characterized the installation. Furthermore, attempts to use rotating cutters have been unsuccessful because of the tendency to rotate the rivet stem within the rivet body with a consequent loosening of the rivet.

It is therefore an object of my invention to provide a cutting tool particularly adapted to the cutting of the protruding stems of blind rivets and which overcomes the above noted disadvantages by rapidly cutting the stem and at the same time smoothing and burnishing the remaining portion to a smooth surface congruent with the contour of the rivet head.

It is also an object of my invention to provide a tool of the character set forth in the preceding paragraph which may be held and operated in one hand.

It is an additional object of my invention to provide a tool of the character set forth in the preceding paragraph which includes a means for ejecting from the tool the cut off portion of the rivet stem.

It is a still further object of my invention to provide a tool of the character referred to hereinbefore which includes a means for manually controlling the rate at which the rivet stem is cut.

Other objects and advantages of my invention will be apparent from a study of the following specifications, read in connection with the accompanying drawings, wherein:

Fig. 1 is a vertical sectional view through a cutting tool comprising the preferred embodiment of my invention and showing the normal positions occupied by the parts prior to the initiation of a cutting operation;

Fig. 2 is a view similar to Fig. 1 but illustrating the relative positions of the parts at the end of a cutting operation, and illustrating the manner in which the cutting of the rivet stem is effected;

Fig. 3 is a perspective view of the stem engaging mandrel portion of the mechanism illustrated in Fig. 1;

Fig. 4 is an end view taken in the direction represented by the line IV—IV in Fig. 1 and showing the planetary motion of the cutting orifice and stem engaging mandrel relative to each other;

Fig. 5 is a fragmentary sectional view illustrating the operation of a stem ejecting means; and Fig. 6 is a cross sectional view taken substantially along the line VI—VI of Fig. 2.

Referring now to the drawings, I have illustrated in Fig. 1 the preferred embodiment of my invention as comprising a stem trimmer for severing the protruding rivet stem remaining after the setting of certain types of blind rivets. The apparatus which is illustrated in Fig. 1 includes a housing 1 to which is secured a handle member 2 permitting the device to be held in the hand of an operator. The forward end of the housing 1 may be threaded as indicated at 3 to receive a cap member 4. The cap member 4 includes a forwardly projecting cylindrical portion 5 of reduced diameter to thereby provide a radially extending flange portion 6.

The interior of the housing 1 is bored as shown at 7 and in the forward portion of the housing 1 this bore is increased in diameter, as shown at 8, to receive a roller or needle bearing 9. Endwise movement of the needle bearing 9 in one direction with respect to the housing 1 is prevented by a shoulder 10 formed by the enlarged bore portion 8, and in the other direction by a washer member 11 which slides within the enlarged bore portion 8 and is held in place by means of the cap 4. The washer 11 and the cap 4 are both internally bored and the edges of the bores are chamfered as shown at 12 and 13 to define a quasi-spherical socket for receiving a spherical ball portion 15 formed upon a stem-engaging mandrel member 16. The ball and socket joint thus formed serves to hold the stem engaging mandrel 16 within the housing against translatory motion while permitting limited universal motion thereof. The mandrel member 16 includes a portion 17 extending forwardly from the ball 15 to a point near the forwardmost end of the cylindrical cap extension 5. It also includes a rearwardly extending portion 18 upon which is mounted a bearing member 19. The bearing member 19 is preferably a ball or roller bearing characterized by including an outer race member, the external surface of which constitutes a segment of a spherical surface. The bearing member 19 is slidably received within a bore 20 formed in the driving member 21, the bore 20 being extended at an acute angle to the axis of the driving member 21. The driving member 21 is rotatable and slidable within the bore 7 and within the needle bearing 9, and is arranged to be rotated by a shaft 22 which is formed integrally with the driving member 21 or suitably attached thereto, and which extends rearwardly through an open rear end 23 of the housing 1. The driving member 22 may be rotated by any suitable means, as by hand or through a flexible shaft extension 55 to a suitable power means 60 shown in Fig. 1. If desired a power driving means such as an electric or pneumatic motor 65 (Fig. 2) may be mounted on the apparatus and in connection with the drive shaft 22.

The shaft 22 is journaled for rotation by means of an aft bearing 24 which is supported in a sliding collar 25 positioned within the bore 7. Rearward movement of the sliding collar 25 may be limited to the position shown in Fig. 1 by means of a snap ring 26 placed within the aft end of the bore 7. It will be appreciated that sliding movement of the collar 25 to the left, as viewed in Fig. 1, will slide the driving member 21 to the left to a position such as is shown in Fig. 2. In such position the roller or needle bearing 9 provides the principal means which mounts the driving member 21 for rotation within the housing 1.

The above described sliding movement of the collar 25 is effected by means of a hand-grip member 27 which is pivoted to the handle 2 as by means of a pivot pin 28. A suitable spring such as that shown at 29 normally urges the hand-grip member 27 to the position shown in Fig. 1. As is illustrated in Fig. 6, the hand-grip member 27 is bifurcated to provide a pair of upstanding arms 30 and 31 which extend upwardly along opposite sides of the housing 1 to a point somewhat above the horizontal diameter thereof. The upstanding portions 30 and 31 are vertically slotted, as shown at 32 in Fig. 2, to receive drive pins 33 and 34 mounted upon the sliding collar 25 and passed through longitudinally extending slots 35 formed in the housing 1. It will be seen that an operator of the tool may grip the hand-grip member 27 to move the same from the position shown in Fig. 1 to that shown in Fig. 2 and by so doing slide the drive member 21 from the position shown in Fig. 1 to that which is shown in Fig. 2.

The inclined bore 20 which is formed in the drive member 21 is preferably so positioned as to dispose the center of the bearing member 19 on the axis of rotation of the driving member 21 when the mechanism is in its normal or initial position as shown in Fig. 1. Accordingly, when the driving member 21 is moved forwardly to the position shown in Fig. 2 the inclination of the bore 20 will shift the center of the bearing member 19 to a point to one side of the axis of rotation of the driving member 21 so that upon rotation of the driving member the bearing member 19 will be moved through a circle centered on the axis of rotation of the driving member. It will be seen that the radius of this circle is a function of the distance through which the driving member 21 is moved from the initial position shown in Fig. 1.

The outermost end of the cylindrical cap extension 5 may be threaded as shown at 36 to receive a cap member 37 used to clamp against the end of the extension 5 an orifice defining plate 38. The orifice defining plate 38 has formed therein an orifice 39 for receiving a rivet stem, the orifice 39 being sharpened as indicated at 40.

The mandrel member 16 is provided with an internal stem receiving bore 41 within which is slidably mounted a spring pressed ejector member 42. Between the ejector 42 and the bottom of the bore 41 there is placed a compression spring 43. The spring 43 is preferably tapered as shown so that the innermost end 44 thereof may frictionally engage the walls of the bore 41 to retain the spring therein. The ejector 42 is preferably suitably secured as by soldering or brazing to the outer end of the spring 43.

The operation of the tool may be seen by having reference to Fig. 2 wherein I have shown in fragmentary section two plates 45 and 46 as being secured to each other by a blind rivet. The blind rivet includes a tubular rivet body 47 which carries an outer head 48. Within the body 47 there is placed a stem 49 having an enlargement 50 on an inner end thereof which operates to flare or head the inner end of the rivet body as shown at 51. At the completion of the rivet setting operation the stem 49 extends a considerable distance beyond the plate 45, including a stem portion 52 which in Fig. 2 is shown as being received within the bore 41 and already severed from the portion 49 remaining in the rivet. It will be understood that this is a result of the operation of the tool and that prior to the operation of the tool the portion 52 is an integral part of the stem 49.

In accordance with my invention the stem portion 52 is severed from the remainder 49 by first disposing the tool parts in their normal position, as shown in Fig. 1, to align the stem receiving portion 41 with the orifice 39. With the parts in this position the tool may be placed over the rivet stem, the portion 52 entering the stem-receiving bore 41 and pushing the ejector member 42 inwardly against the restoring force of the compression spring 43. If then the drive member 21 is rotated and at the same time slid to the left, as viewed in Fig. 1, there will be imparted to the outermost end of the mandrel 16 a planetary motion with respect to the orifice 39. Since the mandrel 16 is held against movement by its engagement with the protruding stem portion 52 it will be seen that the entire tool, including the housing 1, the cap extension 5 and the orifice 39, will be caused to move with respect to the mandrel 16 and with respect to the rivet stem portion 52. It will be appreciated that by virtue of the mechanism hereinbefore described the motion thus imparted to the orifice 39 with respect to the rivet stem 52 will be a planetary motion in which the orifice 39 undergoes no rotation about its own center. The center of the orifice 39 is thus caused to describe a circular motion about the axis of the mandrel receiving bore 41. The radius of this circle is initially zero when the parts are in the position shown in Fig. 1, and is increased gradually by movement of the hand-grip member 27 until a maximum radius is reached when the parts are disposed in the position shown in Fig. 2. The mechanism is so proportioned as to cause this radius to be somewhat greater than the radius of the stem portion 49 so that the cutting edge 39 in progressing around the stem portion 52 will be moved nearer and nearer the center thereof to finally completely sever the stem portion 52 as is shown in Fig. 2. Since the orifice plate 38 does not rotate about its own axis it is slid over the cut surface of the stem portion 52 during the cutting operation so as to smooth and burnish the cut surface. By employing a sharpened edge 40 of the character shown in Figs. 1 and 2 the contour of the stem 49 remaining is caused to conform very closely to the contour of the rivet head 48.

At the conclusion of the cutting operation the parts will be disposed in the position shown in Fig. 2, in which position the bore 41 is no longer aligned with the orifice 39. The stem portion 52 is therefore retained in the bore 41 until the hand-grip member 27 is released to restore the parts to the position shown in Fig. 1. This axially aligns the bore 41 with the orifice 39 and permits the spring pressed ejector member 42 to eject the severed rivet stem portion 52 in the manner illustrated in Fig. 5.

From the foregoing it will be observed that I have provided a cutting tool which is particularly adapted to the severing of blind rivet stems, and which is so arranged as to permit it being held and operated in one hand. The mechanism described includes a means for causing a sharp-edged orifice to move with a planetary motion about the rivet stem to be cut, and means is provided for adjusting the radius of this planetary motion so that the cutting of the rivet stem may be effected at any desired and controlled rate.

It will be noted that the orifice plate which defines the cutting orifice does not rotate about its own center as the cutting proceeds. This avoids the difficulty characterizing some former types of tools in that the rivet stem was rotated with a consequent loosening of the rivet stem within the rivet body and a corresponding reduction in the strength and tightness of the riveted joint.

Attention is directed particularly to the provision of the ejecting mechanism which permits the severed portion to be automatically ejected from the tool by merely restoring the tool parts to their initial positions as in preparation for the severing of another rivet stem.

While I have shown and described the preferred embodiment of my invention, I do not desire to be limited to any of the details of construction shown or described herein.

I claim:

1. In a cutter for severing the protruding stem of a blind rivet, the combination of: a member having an orifice for receiving said stem and having sharpened edges; and a mechanism that displaces said member about said stem with a planetary motion with respect to said stem whereby said motion causes said sharpened edges to cut into said stem and sever said stem.

2. In a cutter for severing the protruding stem of a blind rivet, the combination of: a member having an orifice for receiving said stem and having sharpened edges; a drive unit engaging said stem and imparting to said member a planetary motion with respect to said stem; and a support for holding said orifice member against rotation about the center of said orifice.

3. In a cutter for severing the protruding stem of a blind rivet, the combination of: a member having an orifice for receiving said stem and having sharpened edges; a drive unit engaging said stem and imparting to said member a planetary motion with respect to said stem whereby the center of said orifice is moved around a circle centered on said stem; and a movable element associated with said drive unit for varying the radius of said circle during said motion.

4. In a cutter for severing the protruding stem of a blind rivet, the combination of: a member having an orifice for receiving said stem and having sharpened edges; mandrel means for engaging said stem; and a drive unit for imparting to said orifice member a plantary motion about said mandrel whereby the center of said orifice is moved around a circle centered on said stem.

5. In a cutter for severing the protruding stem of a blind rivet, the combination of: a member having an orifice for receiving said stem and having sharpened edges; mandrel means for engaging said stem; a drive unit engaging said stem and imparting to said member a planetary motion about said mandrel whereby the center of said orifice is moved around a circle centered on said stem; and a support for holding said orifice member against rotation about the center of said orifice.

6. In a cutter for severing the protruding stem of a blind rivet, the combination of: a member having an orifice for receiving said stem and said orifice having sharpened edges; mandrel means for engaging said stem; a drive unit for imparting to said orifice member a planetary motion about said mandrel whereby the center of said orifice is moved around a circle centered on said stem; and a movable element associated with said drive unit for varying the radius of said circle during said motion.

7. In a cutter for severing the protruding stem of a blind rivet, the combination of: means defining an orifice for receiving said stem and having sharpened edges; mandrel means having a bore therein for receiving said stem; means for imparting to said orifice defining means a planetary motion about said mandrel whereby the center of said orifice is moved around a circle centered on said stem; means for varying the radius of said circle during said motion; and ejector means in said bore for ejecting therefrom the stem severed by said motion of said orifice defining means.

8. In a cutter for severing the protruding stem of a blind rivet, the combination of: a member having an orifice for receiving said stem and having sharpened edges; a drive unit for imparting to said orifice member a plantary motion with respect to said stem; and an ejector for ejecting from said orifice the stem severed by said motion of said orifice.

9. In a cutter for severing the protruding stem of a blind rivet, the combination of: a housing; a mandrel in said housing having a stem receiving bore formed at one end thereof; mounting means in said housing for holding said mandrel against translatory motion while permitting universal pivotal movement thereof; drive means in said housing engaging said mandrel for imparting to said mandrel a planetary motion of said one end relative to said housing; and means on said housing defining a sharp edged orifice adjacent said end whereby the center of said orifice is moved in a circle about a stem received in said bore.

10. In a cutter for severing the protruding stem of a blind rivet, the combination of: a housing; a mandrel in said housing having a stem receiving bore formed at one end thereof; mounting means in said housing for holding said mandrel against translatory motion while permitting universal pivotal movement thereof; drive means in said housing engaging said mandrel for imparting to said mandrel a planetary motion of said one end relative to said housing; means on said housing defining a sharp edged orifice adjacent said end whereby the center of said orifice is moved in a circle about a stem received in said bore; and means coacting with said drive means for varying the radius of said circle during said motion.

11. In a cutter for severing the protruding stem of a blind rivet, the combination of: a housing; a mandrel in said housing having a stem receiving bore formed at one end thereof; a ball and socket bearing in said housing holding said mandrel against translatory motion while permitting universal pivotal movement thereof; a drive member in said housing; means mounting said drive member for simultaneous rotation and axial sliding movement in said housing, said drive member having a longitudinally extending cylindrical bore formed therein at an acute angle to the axis of rotation of said drive member; a bearing on said mandrel received in said cylindrical bore; means for rotating said drive member, whereby there is imparted to said mandrel a planetary motion of said end thereof relative to said housing; means on said housing defining a sharp edged orifice adjacent said end; and means for sliding said drive member in said housing during rotation thereof.

12. In a cutter for severing the protruding stem of a blind rivet, the combination of: a housing; a mandrel in said housing having a stem receiving bore formed at one end thereof; a ball and socket bearing in said housing holding said mandrel against translatory motion while permitting universal pivotal movement thereof; a drive member in said housing; means mounting said drive member for simultaneous rotation and axial sliding movement in said housing, said drive member having a longitudinally extending cylindrical bore formed therein at an acute angle to the axis of rotation of said drive member; a bearing on said mandrel received in said cylindrical bore; means for rotating said drive member; means on said housing defining a sharp edged orifice adjacent said end; means for sliding said drive member in said housing during rotation thereof; and spring pressed ejector means in said stem receiving bore for ejecting therefrom the stem severed by the planetary motion of said orifice thereabout and resulting from rotation of said drive member.

13. In a stem cutter that also burnishes the cut stem, the combination of: a member having an orifice for receiving said stem, which orifice has sharpened edges; a drive unit for imparting to said orifice member a planetary motion with respect to said stem; and a source of power having a driving engagement with said drive unit, whereby the planetary motion of the orifice member causes the sharp edges of the orifice to bite into the stem in a progressive manner, burnishing the surfaces as they are progressively cut.

14. In a cutter for severing the protruding stem of a blind rivet, the combination of: a handle; a housing mounted on said handle and having a portion thereof apertured and the edges of the aperture sharpened; a drive unit disposed within said housing; a stem-gripping element driven within a circular path within said housing adjacent to said aperture; and a motor secured to said housing for driving said drive unit.

HERBERT L. TRAUTMANN.

REFERENCES CITED

The following references are of record in the file of this patent:

UNITED STATES PATENTS

| Number | Name | Date |
|---|---|---|
| 535,771 | Richards | Mar. 12, 1895 |
| 1,085,967 | Brown | Feb. 3, 1914 |
| 1,206,311 | Dillinger | Nov. 28, 1916 |
| 2,371,423 | Buchet | Mar. 13, 1945 |